United States Patent [19]

Kusakabe

[11] Patent Number: 4,888,643
[45] Date of Patent: Dec. 19, 1989

[54] SPECIAL EFFECT APPARATUS
[75] Inventor: Susumu Kusakabe, Kanagawa, Japan
[73] Assignee: Sony Corporation, Tokyo, Japan
[21] Appl. No.: 167,364
[22] Filed: Mar. 14, 1988
[30] Foreign Application Priority Data
  Apr. 17, 1987 [JP] Japan .................................. 62-94883
[51] Int. Cl.[4] ........................ H04N 5/262; H04N 9/74
[52] U.S. Cl. .................................. 358/183; 358/182;
  358/22; 382/47; 340/723
[58] Field of Search ................. 358/20, 160, 182, 183;
  340/723, 728, 740; 382/44, 47

[56] References Cited
U.S. PATENT DOCUMENTS

| | | | |
|---|---|---|---|
| 4,620,228 | 10/1986 | Mikado ............................... | 358/160 |
| 4,631,750 | 12/1986 | Gabriel et al. ....................... | 358/22 |
| 4,680,630 | 7/1987 | Field ................................... | 358/160 |
| 4,713,693 | 12/1987 | Southworth et al. ............... | 358/160 |
| 4,725,887 | 2/1988 | Field ................................... | 358/160 |
| 4,757,384 | 7/1988 | Nonweiler et al. .................. | 358/22 |

FOREIGN PATENT DOCUMENTS

| | | | |
|---|---|---|---|
| 0046366 | 4/1981 | Japan ................................... | 358/22 |
| 0046368 | 4/1981 | Japan ................................... | 358/22 |
| 0046370 | 4/1981 | Japan ................................... | 358/22 |

Primary Examiner—John K. Peng
Attorney, Agent, or Firm—Philip M. Shaw, Jr.

[57] ABSTRACT

A special effect apparatus for use in production of a television program or the like, including a latch circuit to obtain delayed video data by delaying input video data for a predetermined time. The input video data and such delayed video data are outputted selectively via switch means at the proper timing that conforms to a desired mosaic pattern, so that continuous video data can be produced for a desired period of time to form a mosaic display element of a desired size and/or shape.

7 Claims, 4 Drawing Sheets

SPECIAL EFFECT APPARATUS

BACKGROUND OF THE INVENTION

1. Field of the Invention

The present invention relates to a special effect apparatus for use in production of a television program or the like.

2. Description of the Prior Art

In television broadcasting and so forth, there is known a technique for blurring a picture either partially or entirely on a display screen by the use of a special effect apparatus, wherein a picture portion to be blurred is visually represented so that display elements of predetermined sizes (hereinafter referred to as mosaic display elements) are gathered to form the picture portion, thereby achieving a mosaic effect which represents a portion with coarse details by employing the mosaic display elements as display units.

In such a mosaic effect with coarse details, the relevant picture portion can be displayed with adequate blur to meet requirements without being represented precisely and, since the contents of the mosaic display elements are derived from the video signals of the original picture, there is the advantage that any strangeness which might be perceived in the blurred picture portion is relatively small.

One of the conventional special effect apparatus of the type mentioned is disclosed in Japanese Laid-open Patent No. 58 (1983)-14678, wherein video signals sampled intermittently are written into a memory and, when the signals are read out from the memory, the intermissions thereof are interpolated so that the same video signals are rendered continuous both horizontally and vertically at predetermined intervals to form mosaic display elements.

If the size, shape and display position of each mosaic display element can be specified in accordance with selected requirements, the mosaic effect can be utilized as one means of expression for video creation in production of a variety of television programs.

However, in the conventional special effect apparatus where intermittently sampled video signals are interpolated via a memory, it has been difficult to execute a practical dynamic change of the signal sampling interval or the timing to write or read the signals in or from the memory.

SUMMARY OF THE INVENTION

The present invention has been accomplished in view of the circumstances mentioned. Its object resides in providing an improved special effect apparatus of a simplified structure which is capable of forming mosaic display elements of desired shapes and sizes at desired positions on a picture.

According to an aspect of the present invention, the special effect apparatus comprises a latch circuit to obtain delayed video data by delaying input video data for a predetermined time, wherein the input video data and such delayed video data are outputted selectively via switch means to form mosaic display elements of desired sizes and/or shapes.

Since the input video data are delayed for a predetermined time through the latch circuit, continuous video data can be produced for a desired period of time by selectively outputting the input video data and the delayed video data via switch means.

Thus, a mosaic display element of a desired size and/or shape is formed as the input video data and the delayed video data are selectively switched at the proper timing that conforms to a desired mosaic pattern.

DETAILED DESCRIPTION OF THE PREFERRED EMBODIMENT

Hereinafter an exemplary embodiment of the present invention will be described in detail with reference to the accompanying drawings.

Figure 1:
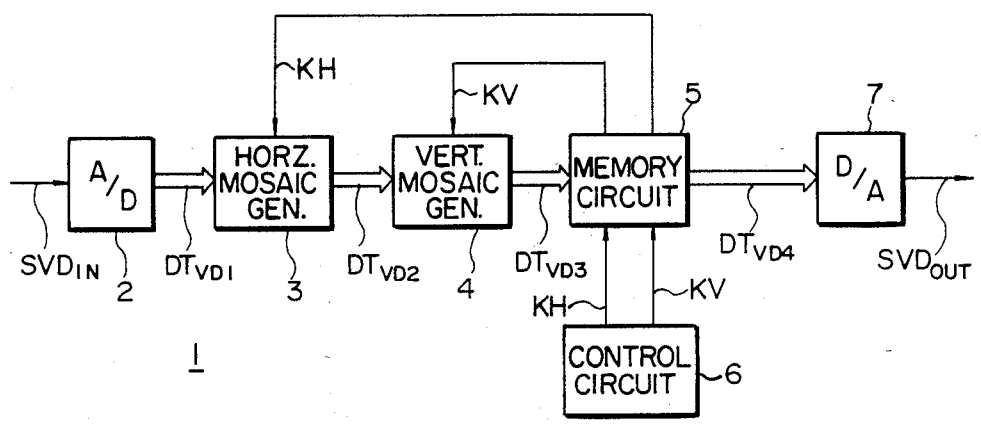
FIG. 1 is a block diagram of an exemplary special effect apparatus embodying the present invention.

In FIG. 1, a reference numeral 1 denotes the entirety of a special effect apparatus according to the present invention, wherein input video data SVDIN is fed to an analog-to-digital converter 2 so that, for example, information of one pixel (which is composed of three (red, blue and green) dots) is converted into video data $DT_{VD1}$ having a 15-bit digital value.

Such video data $DT_{VD1}$ is fed, synchronously with a pixel clock, to a horizontal mosaic generator 3 which outputs it as video data $DT_{VD2}$ to a vertical mosaic generator 4 which generates an output $DT_{VD3}$. Together, the horizontal mosaic generator 3 and the vertical mosaic generator 4 constitute a latch circuit. The signals $DT_{VD2}$ and $DT_{VD3}$ are delayed by the horizontal mosaic generator 3 and the vertical mosaic generator 4, respectively, from the signal $DT_{VD1}$ for periods of one pixel clock and one horizontal scanning interval, respectively. The video data $DT_{VD3}$ is written into a memory circuit 5 and video data $DT_{VD4}$ is read out from the memory circuit 5, synchronously with a pixel clock. The video data $DT_{VD4}$ is converted into an analog signal by a digital-to-analog converter 7, and then transmitted therefrom as an output video data $SVD_{OUT}$.

Figure 2:
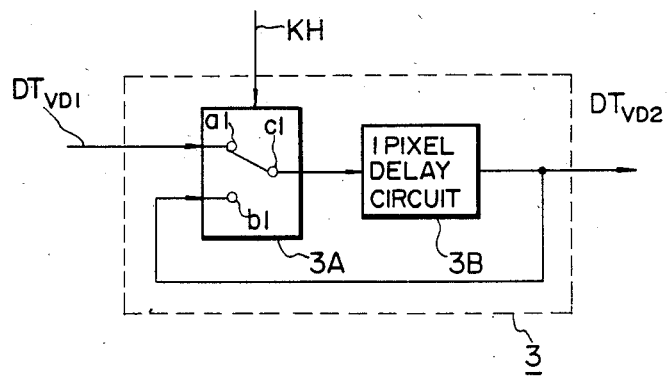
FIGS. 2 and 3 are connection diagrams of horizontal and vertical mosaic generators of a latch circuit in the apparatus of FIG. 1.

The horizontal mosaic generator 3 is so contrived as to execute simultaneous parallel processing of the 15-bit video data $DT_{VD1}$ inputted thereto. As shown in FIG. 2 with regard to one bit, the video data $DT_{VD1}$ inputted synchronously with a pixel clock is fed via a first input terminal a1 and an output terminal c1 of a single pole, double throw switch circuit 3A to a one-pixel delay circuit 3B, so as to be delayed for a time corresponding to one pixel clock, and is then outputted as video data $DT_{VD2}$ while also being fed back to a second input terminal b1 of the switch circuit 3A.

In the switch circuit 3A, the first input terminal a1 is selected when a horizontal mosaic key signal KH inputted to the 15-bit horizontal mosaic generator 3 synchronously with a pixel clock is a logic "0" level. Otherwise, the second input terminal a2 is selected, i.e. when the signal KH is a logic "1" level.

Consequently, when the horizontal mosaic key signal KH is a logic "0" level, the input video data $DT_{VD1}$ is delayed for a time corresponding to one pixel clock and is obtained as video data $DT_{VD2}$ from the output terminal of the horizontal mosaic generator 3. However, when the horizontal mosaic key signal KH is a logic "1" level, the video data of one pixel immediately before the input video data $DT_{VD1}$ is delayed for a time corresponding to one pixel clock and is obtained as video data $DT_{VD2}$ from the output terminal. In this way a mosaic display element composed of continuous pixels can be formed in accordance with the mosaic pattern which horizontally consists of logic levels of the horizontal mosaic key signal KH.

Figure 3:
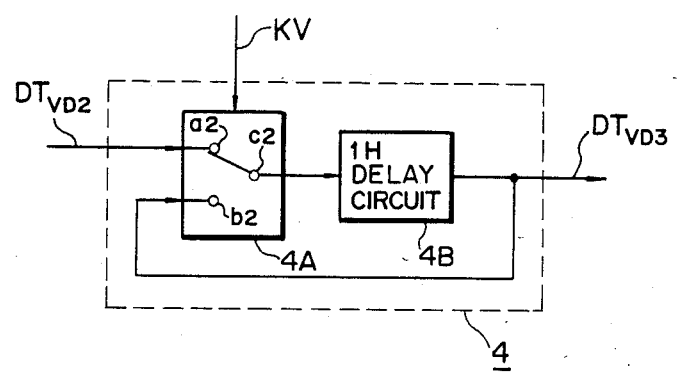

The vertical mosaic generator 4 is similar in configuration to the horizontal mosaic generator 3 and is so contrived as to execute simultaneous parallel processing of the input video data $DT_{VD2}$. As shown in FIG. 3 with regard to one bit, the video data $DT_{VD2}$ inputted synchronously with a pixel clock is fed via a first input terminal a2 and an output terminal c2 of a single pole, double throw switch circuit 4A to a 1H delay circuit 4B so as to be delayed for a predetermined time corresponding to one horizontal scanning interval. It is then is outputted as video data $DT_{VD3}$ while also being fed back to a second input terminal b2 of the switch circuit 4A.

In the switch circuit 4A, the first input terminal a2 is selected when a vertical mosaic key signal KV inputted to the 15-bit vertical mosaic generator 4 synchronously with a pixel clock is a logic "0" level and the second input terminal b2 is selected when the signal KV is a logic "1" level.

Consequently, when the vertical mosaic key signal KV is a logic "0" level, the input video data $DT_{VD2}$ is delayed for a time corresponding to one horizontal scanning interval and is obtained as video data $DT_{VD3}$ from the output terminal of the vertical mosaic generator 4. However, when the vertical mosaic key signal KV is a logic "1" level, the video data of one pixel one horizontal scanning interval prior to the input video data $DT_{VD2}$ is delayed for a time corresponding to one horizontal scanning interval and is obtained as video data $DT_{VD3}$ from the output terminal. In this way a mosaic display element composed of continuous pixels can be formed in accordance with the mosaic pattern which vertically consists of logic levels of the vertical mosaic key signal KV.

Figure 4:
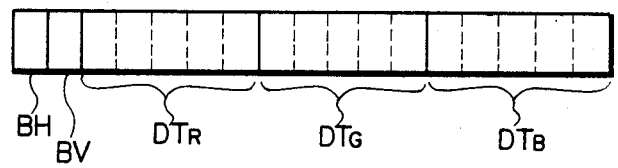
FIG. 4 is a schematic diagram of the contents of a digital-memory circuit corresponding to one pixel.

The frame memory 5 has 17-bit word memory cells equal in number to the pixels of one picture. In this embodiment, the word data are so arrayed that, as shown in FIG. 4, blue, green and red digital data $DT_B$, $DT_G$ and $D_{TR}$ are stored respectively by the use of five bits from the least significant bit. Meanwhile, the horizontal mosaic key signal KH and the vertical mosaic key signal KV, corresponding to one pixel posterior to one frame are previously written, in response to an instruction from the operator, in the high-order two bits BH and BV via a control circuit 6 including a CPU and a memory.

Figure 5:
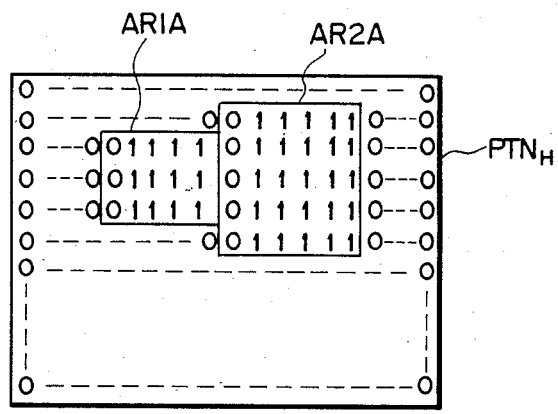
FIGS. 5 and 6 are schematic diagrams of horizontal and vertical mosaic patterns.

The horizontal mosaic key signal KH of one picture previously written in the frame memory 5 has, for example, a horizontal mosaic pattern $PTN_H$, as illustrated in FIG. 5, where the respective horizontal left-end bits of two rectangular areas AR1A and AR2A corresponding to first and second rectangular areas of desired positions and sizes in the display picture are logic "0" levels while the other bits thereof are logic "1" levels, and the signal KH of such pattern is supplied to the horizontal mosaic generator 3 synchronously with a pixel clock.

Figure 6:
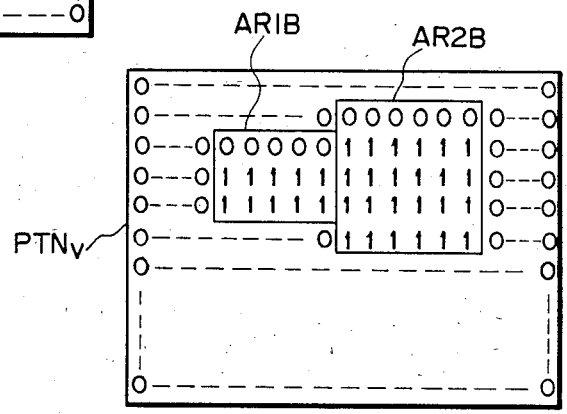

In addition to the above, the vertical mosaic key signal KV of one picture previously written in the frame memory 5 has a vertical mosaic pattern $PTN_V$, as illustrated in FIG. 6, where the respective vertical upper-end bits of two rectangular areas AR1B and AR2B, similar to those in the aforesaid horizontal mosaic pattern $PTN_H$ of FIG. 5, are logic "0" levels while the other bits thereof are logic "1" levels, and the signal KV of such pattern is supplied to the vertical mosaic generator 4 synchronously with a pixel clock.

Figure 7:
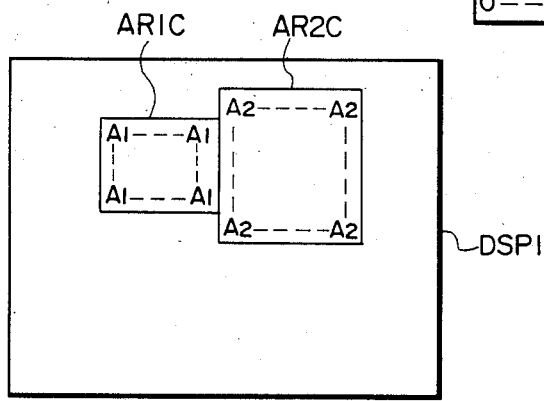
FIG. 7 is a schematic diagram illustrating mosaic display elements.

The video data $DT_{VD3}$ thus inputted to the frame memory 5 via the horizontal mosaic generator 3 and the vertical mosaic generator 4 is read out as video data $DT_{VD4}$ synchronously with a pixel clock and is fed to the digital-to-analog converter 7, which then produces an analog output video signal $SVD_{OUT}$ and feeds it to a display unit (not shown) so that, as illustrated in FIG. 7, there is formed on a display screen DSP1 a mosaic display element where the first and second rectangular areas AR1C and AR2C are smeared out with pixels A1 and A2 at the left upper ends within the respective areas.

Figure 8:
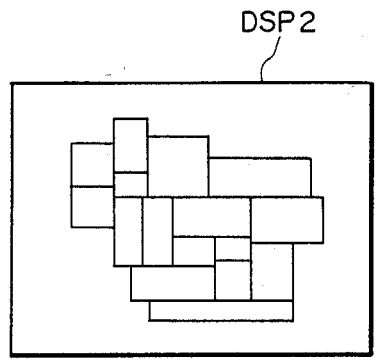
FIGS. 8 through 11 are schematic diagrams of mosaic display elements formed on a display screen by the special effect apparatus.
Figure 9:
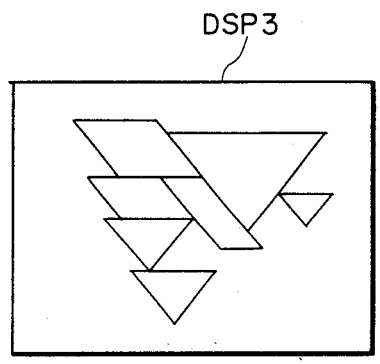

If horizontal and vertical mosaic patterns individually having desired shapes, sizes and positions are used instead of the horizontal mosaic key signal KH and the vertical mosaic key signal KV composed respectively of the horizontal mosaic pattern $PTN_H$ and the vertical mosaic pattern $PTN_V$ shown in FIGS. 5 and 6, then it becomes possible to form mosaic display elements of desired shapes, sizes and positions on the display screens DSP2 and DSP3 as shown in FIGS. 8 and 9, respectively.

The configuration for feeding the horizontal and vertical mosaic key signals KH and KV from the control circuit 6 via the frame memory 5 to the horizontal and vertical mosaic generators 3 and 4 is based on the idea that, since the processing clock of the CPU in the control circuit 6 is much slower than the pixel clock, the horizontal and vertical mosaic key signals KH and KV corresponding to a plurality of pixels are written once in the frame memory 5 and are then read out simultaneously with the video data $DT_{VD4}$ in response to a pixel clock, whereby the synchronism is maintained between the CPU clock and the pixel clock.

According to the constitution mentioned above, due to the provision of delay circuits 3B and 4B for producing delayed digital data, which have a delay of one pixel and one horizontal scanning interval, respectively, to the video data $DT_{VD1}$ and $DT_{VD2}$ obtained by converting the video signal $SVD_{IN}$, there can be realized a special effect apparatus 1 which is capable of forming a mosaic display element of a desired size and shape at a desired position on the display screen by selectively switching and outputting the video data $DT_{VD1}$ and $DT_{VD2}$ or the delayed video data synchronously with a pixel clock.

Figure 10:
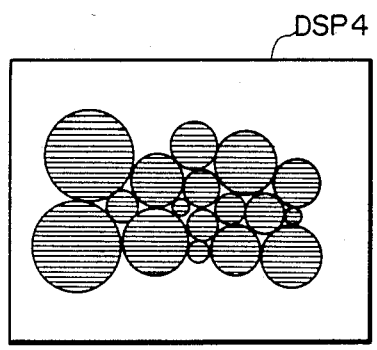
Figure 11:
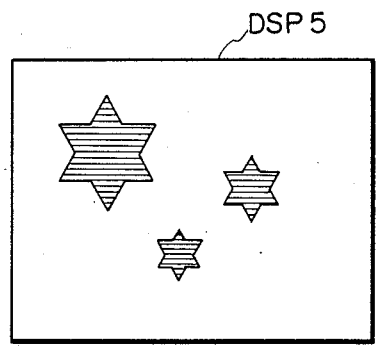

Furthermore, when a horizontal (or vertical) mosaic key signal of a predetermined horizontal (or vertical) mosaic pattern is fed to the horizontal (or vertical) mosaic generator in the above embodiment, there are formed, as illustrated in FIGS. 10 and 11, display pictures DSP4 and DSP5, each including a mosaic display element which is composed of combined figures of desired sizes and shapes with horizontal (or vertical) stripes.

Thus, in production of a television program for example, a mosaic display element of any shape and size can be formed at any position specified in accordance with user selected requirements, so that it becomes possible to blur the display picture as desired in compliance with the video creative intention, thereby attaining special picture effects that have been unrealizable heretofore.

In the above embodiment, the video data is passed through the horizontal mosaic generator and the vertical mosaic generator in this order to generate a desired mosaic display element. However, the constitution can be so modified as to pass the video data in the order of the vertical mosaic generator and the horizontal mosaic generator, and still the same effect as the above can be achieved by the use of vertical and horizontal mosaic key signals KV and KH conforming to such a modified constitution.

Furthermore, in case the 17-bit word frame memory employed in the above embodiment is replaced with a 16-bit word type, the same effect is achievable by using two of the latter frame memories. It is also possible to attain the same effect as in the above embodiment by using, without diversion of surplus bits in the frame memory, a suitable memory where horizontal and vertical mosaic key signals can be written synchronously with the CPU clock in the control circuit and can be read out synchronously with the pixel clock.

Although in the above embodiment a description has been given of an application of the special effect apparatus to an exemplary case of producing a television program, it is to be understood that the present invention is not limited thereto and is applicable also to other electric apparatus such as an editing device of a video tape recorder or the like.

Thus, according to the present invention, an improved special effect apparatus of a simplified structure can be realized with a latch circuit provided for obtaining delayed video data with a predetermined delay time relative to the input video data, and a mosaic display element of a desired size and/or a desired shape can be formed by selectively switching and outputting such input video data and delayed video data.

While an exemplary embodiment of the present invention has been described hereinabove, it will be apparent to those skilled in the art that various minor modifications can be made therein without departing from the spirit and scope of the invention as claimed.

What is claimed is

1. A special effect apparatus comprising:
means for receiving an input digital, video signal;
a latch circuit for latching the input digital video signal for a predetermined time; and
a control circuit connected to said latch circuit and serving to control the latch time, said control circuit including a memory circuit for storing the latch data at predetermined picture display positions.

2. A special effect apparatus comprising:
means for receiving an input digital, video signal;
a latch circuit for latching the input digital video signal for a predetermined time, the latch circuit including horizontal mosaic generator means for causing a mosaic display element to be formed of a horizontal line of repeated pixels and vertical mosaic generator means for causing a mosaic display element to be formed of a vertical line of repeated pixels; and
a control circuit connected to said latch circuit and serving to control the latch time, said control circuit including a memory circuit for storing the latch data at predetermined picture display positions.

3. An apparatus according to claim 2, wherein said horizontal mosaic generator comprises a switch circuit having two input terminals, one of which receives input digital video data, and an output terminal and means for selectively connecting the output terminal to either of the two input terminals in response to a horizontal mosaic key signal and a 1 pixel delay circuit having an input terminal which is connected to the output terminal of the switch circuit and an output terminal which is connected to the other one of the input terminals of the switch circuit.

4. An apparatus according to claim 2, wherein said vertical mosaic generator comprises a switch circuit having two input terminals, one of which receives input digital video data, and an output terminal and means for selectively connecting the output terminal to either of the two input terminals in response to a vertical mosaic key signal and a one horizontal scan line delay circuit having an input terminal which is connected to the output terminal of the switch circuit and an output terminal which is connected to the other one of the input terminals of the switch circuit.

5. An apparatus according to claim 2, wherein said horizontal mosaic generator comprises a first switch circuit having two input terminals, one of which receives input digital video data, and an output terminal and means for selectively connecting the output terminal to either of the two input terminals in response to a horizontal mosaic key signal and a one pixel delay circuit having an input terminal which is connected to the output terminal of the first switch circuit and an output terminal which is connected to the other one of the input terminals of the first switch circuit and further wherein said vertical mosaic generator comprises a second switch circuit having two input terminals, one of which receives input digital video data supplied from the output of the one pixel delay circuit, and an output terminal and means for selectively connecting the output terminal to either of the two input terminals in response to a vertical mosaic key signal and a one horizontal scan line delay circuit having an input terminal which is connected to the output terminal of the second switch circuit and an output terminal which is connected to the other one of the input terminals of the second switch circuit.

6. An apparatus according to claim 2, wherein the means for receiving an input digital video signal comprises an analog-to-digital converter for converting an input analog video signal into a digital signal.

7. An apparatus according to claims 2, 3, 4, or 5 wherein said control circuit includes means for selectively generating horizontal and vertical mosaic key signals which are supplied to the latch circuit for controlling the latch time.

* * * * *